(12) United States Patent
Schick

(10) Patent No.: US 8,091,329 B2
(45) Date of Patent: *Jan. 10, 2012

(54) DEVICE FOR HEIGHT ADJUSTING AND SWINGING A MOWER DECK

(75) Inventor: Scott A. Schick, Corydon, IA (US)

(73) Assignee: Shivvers Group, Incorporated, Corydon, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/383,441

(22) Filed: Mar. 24, 2009

(65) Prior Publication Data

US 2009/0183480 A1 Jul. 23, 2009

Related U.S. Application Data

(60) Continuation of application No. 12/157,406, filed on Jun. 10, 2008, now Pat. No. 7,596,936, and a continuation-in-part of application No. 11/401,973, filed on Apr. 11, 2006, now abandoned, which is a division of application No. 10/619,017, filed on Jul. 14, 2003, now Pat. No. 7,028,456.

(60) Provisional application No. 60/966,374, filed on Aug. 27, 2007.

(51) Int. Cl.
*A01D 34/00* (2006.01)
(52) U.S. Cl. ............................... 56/15.9; 56/14.9
(58) Field of Classification Search .................. 56/15.9, 56/14.9, 15.8, 15.2, 17.1, 17.2, 320.1, 320.2, 56/DIG. 22, 15.6, 16.7, 15.1
See application file for complete search history.

(56) References Cited

U.S. PATENT DOCUMENTS

| | | | |
|---|---|---|---|
| 3,777,459 A | 12/1973 | Elliott | |
| 3,795,094 A | 3/1974 | Mollen et al. | |
| 3,874,150 A | 4/1975 | Boeck | |
| 4,311,204 A | 1/1982 | Shupert | |
| 4,679,382 A | 7/1987 | Saruhashi et al. | |
| 4,760,686 A | 8/1988 | Samejima et al. | |
| 4,779,406 A | 10/1988 | Schroeder | |
| 4,829,754 A | 5/1989 | Shimamura et al. | |
| 4,869,057 A | 9/1989 | Siegrist | |
| 4,930,801 A | 6/1990 | Gillund | |
| 5,025,617 A | 6/1991 | Kuhn et al. | |
| 5,079,907 A | 1/1992 | Sameshima et al. | |
| 5,079,926 A | 1/1992 | Nicol | |
| 5,154,043 A | 10/1992 | Schemelin et al. | |
| 5,355,665 A | 10/1994 | Peter | |
| 5,410,865 A | 5/1995 | Kurohara et al. | |
| 5,433,066 A | 7/1995 | Wenzel et al. | |
| 5,459,984 A | 10/1995 | Reichen et al. | |

(Continued)

OTHER PUBLICATIONS

Brochure Bob-Cat® ZT 200 Series, by Ransomes Bob-Cat.

(Continued)

*Primary Examiner* — Arpad Fabian-Kovacs
(74) *Attorney, Agent, or Firm* — John C. McMahon

(57) ABSTRACT

An underbelly mower has a cutting deck suspended beneath a frame by a height adjustment mechanism. The deck is adjusted between different cutting heights by extendable mechanical advantage device such as an electric screw and hydraulic ram operating in cooperation with the height adjustment mechanism. The mechanical advantage device also operably moves the deck between a cutting configuration and a maintenance configuration. A deck quick release and attachment mechanism, including hook members, operably allows a user to quickly and easily disconnect and reconnect a rear of deck to the frame when moving between cutting and maintenance configurations.

2 Claims, 9 Drawing Sheets

U.S. PATENT DOCUMENTS

| | | | |
|---|---|---|---|
| 5,475,971 A | 12/1995 | Good et al. | |
| 5,528,886 A | 6/1996 | Esau | |
| 5,528,889 A | 6/1996 | Kure et al. | |
| 5,784,870 A | 7/1998 | Seegert et al. | |
| 5,813,203 A | 9/1998 | Peter | |
| 5,816,033 A | 10/1998 | Busboom et al. | |
| 5,816,035 A | 10/1998 | Schick | |
| 5,915,487 A | 6/1999 | Splittstoesser et al. | |
| 5,927,055 A | 7/1999 | Ferree et al. | |
| 5,956,932 A | 9/1999 | Schmidt | |
| 6,012,274 A | 1/2000 | Eavenson et al. | |
| 6,023,921 A | 2/2000 | Burns et al. | |
| 6,079,193 A * | 6/2000 | O'Neill et al. | 56/17.1 |
| 6,293,077 B1 | 9/2001 | Plas et al. | |
| 6,341,480 B1 | 1/2002 | Dahl et al. | |
| 6,347,502 B1 | 2/2002 | deVries | |
| 6,347,503 B1 | 2/2002 | Esau et al. | |
| 6,393,815 B1 | 5/2002 | Funk et al. | |
| 6,398,681 B1 | 6/2002 | Wanie | |
| 6,434,919 B2 | 8/2002 | Schick | |
| 6,470,660 B1 | 10/2002 | Buss et al. | |
| 6,494,028 B2 | 12/2002 | Moore | |
| 6,516,597 B1 | 2/2003 | Samejima et al. | |
| 6,530,200 B1 | 3/2003 | Minoura et al. | |
| 6,546,707 B2 * | 4/2003 | Degelman et al. | 56/15.2 |
| 6,584,756 B2 | 7/2003 | Buss | |
| 6,625,968 B2 * | 9/2003 | Gloudemans et al. | 56/17.1 |
| 6,658,831 B2 | 12/2003 | Velke et al. | |
| 6,675,567 B2 | 1/2004 | Samejima et al. | |
| 6,786,031 B2 * | 9/2004 | Kalista et al. | 56/16.7 |
| 6,874,308 B1 | 4/2005 | Bartel | |
| 6,988,351 B2 | 1/2006 | Schick et al. | |
| 7,013,626 B1 | 3/2006 | Strope | |
| 7,028,456 B2 * | 4/2006 | Thatcher et al. | 56/15.6 |
| 7,062,898 B2 * | 6/2006 | Sarver et al. | 56/320.1 |
| 7,146,786 B2 | 12/2006 | Brandon | |
| 7,293,398 B2 | 11/2007 | Koehn | |
| 7,347,039 B2 | 3/2008 | Koehn | |
| 7,404,282 B2 | 7/2008 | Samejima et al. | |
| 7,441,392 B2 | 10/2008 | Lilliestielke et al. | |
| 7,451,586 B1 | 11/2008 | Papke et al. | |
| 7,481,036 B2 | 1/2009 | Lilliestielke et al. | |
| 7,610,739 B2 * | 11/2009 | Godfrey | 56/15.6 |
| 2002/0194826 A1 | 12/2002 | Schick et al. | |
| 2004/0221561 A1 | 11/2004 | Koehn | |
| 2005/0044836 A1 | 3/2005 | Goto et al. | |
| 2006/0010846 A1 * | 1/2006 | Koehn | 56/14.7 |

OTHER PUBLICATIONS

Brochure Country Clipper® Zero Turn Mowers, by Shivvers, Mfg.
Brochure Country Clipper® Flip Up Deck, by Shivvers Mfg.
Brochure Z48, by Encore.
Brochure ZTR 5000 Series, by Dixon.
Brochure Exmark Lazer A® HP, by Exmark.
Brochure Pro Cut Z's, by Ferris Industries, Inc.
Brochure ZT Max®, by F.D. Kees Manufacturing Co.
Brochure Snapper Yard Cruiser®, by Snapper.
Brochure Twister BZT Zero-Turning-Radius Riding Mower, by Bunton, Division of Jacobsen.
Brochure Great Dane® "Zero Turn Chariot", by Great Dane Power Equipment, Inc.
Brochure Prowler, by Encore Power Equipment.
Brochure MTD Pro MNZ wide-area mower, by MTDpro.
Brochure IS® First With Independent Suspension, by Ferris Industries.

* cited by examiner

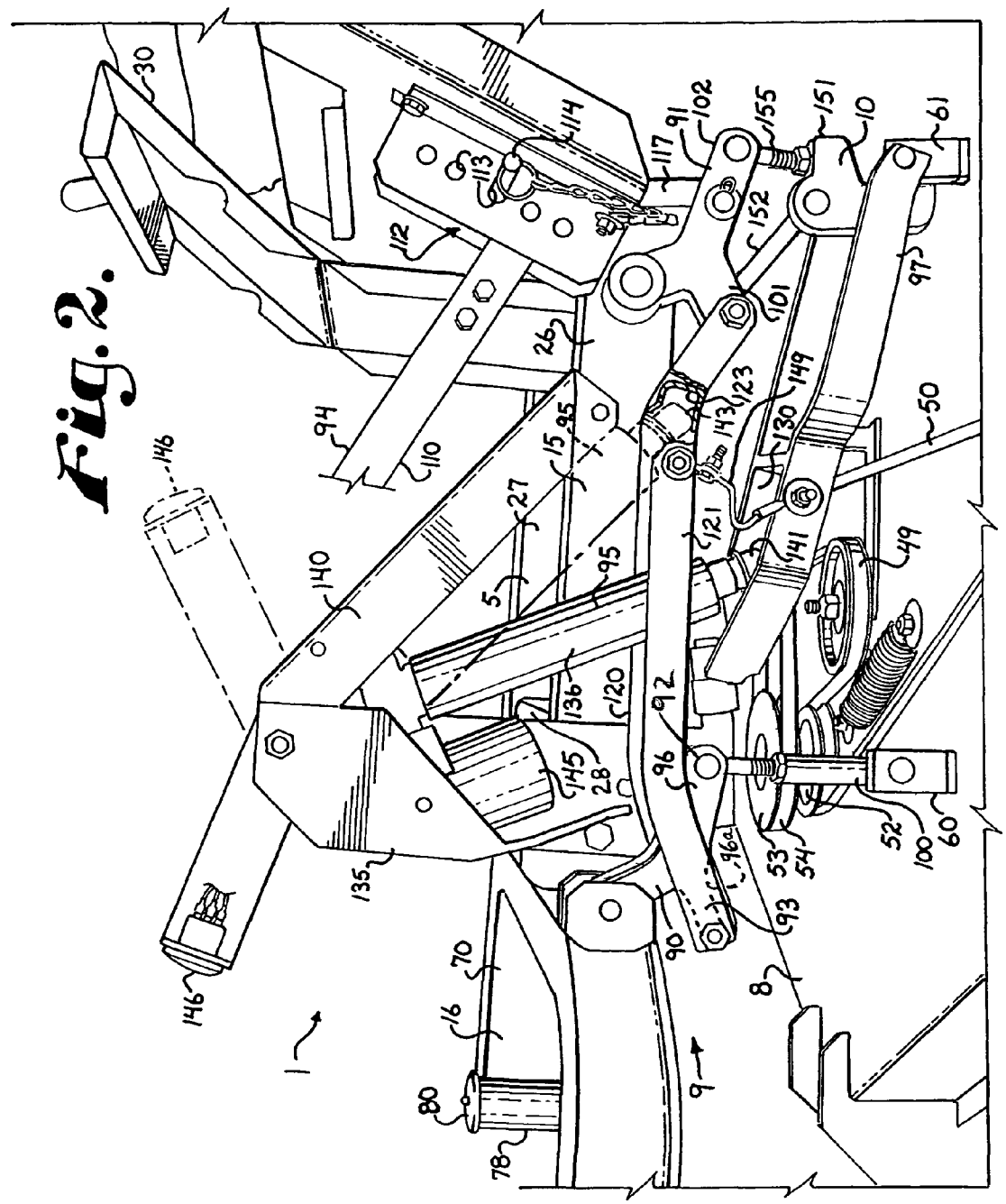

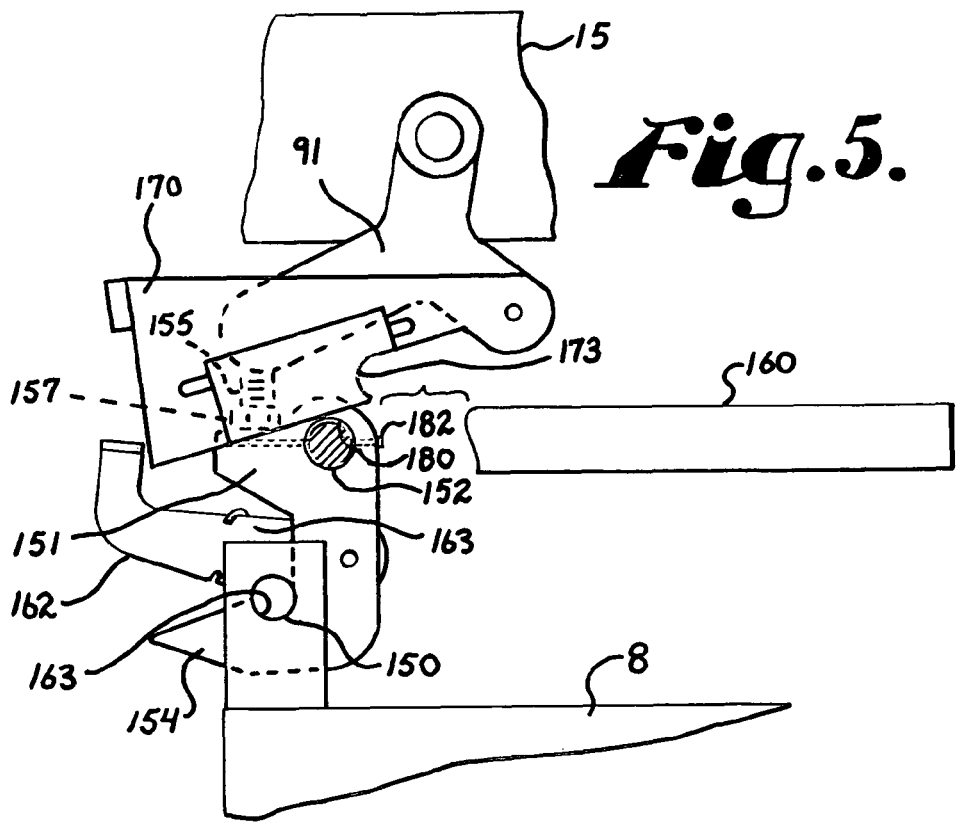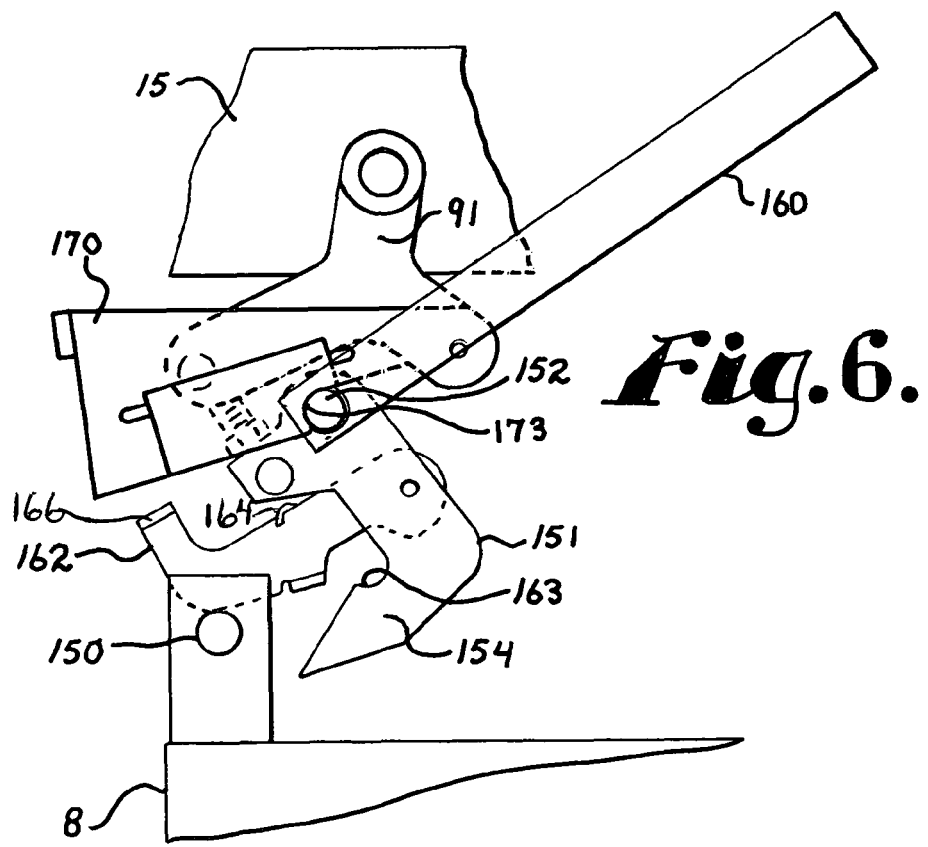

DEVICE FOR HEIGHT ADJUSTING AND SWINGING A MOWER DECK

CROSS REFERENCE TO RELATED APPLICATIONS

This application is a continuation of U.S. patent application Ser. No. 12/157,406, filed Jun. 10, 2008 that claims the benefit of Provisional Application No. 60/966,374, filed Aug. 27, 2007. This application is also a continuation-in-part of U.S. patent application Ser. No. 11/401,973, filed Apr. 11, 2006 that is a divisional of U.S. patent application Ser. No. 10/619,017, filed Jul. 14, 2003, now U.S. Pat. No. 7,028,456, the disclosures of which are incorporated by reference herein.

BACKGROUND OF THE INVENTION

Underbelly mowers are of the type wherein a mower deck is mounted beneath the frame of a tractor or motorized vehicle principally between front and rear wheels of the vehicle. These are very commonly manufactured and used.

A principal drawback of such mowers is that they are difficult to maintain and clean because of the location of the mowing deck and the difficulty in getting it raised for such maintenance. In order to get to the underside, the mower deck is traditionally disassembled from the tractor and then ungainly pulled from beneath the frame in order to free the deck of the frame raised on one side or the tractor itself must be raised so as to balance on the rear to give access which is both somewhat unstable and often difficult to accomplish because the mower and even the mowing deck are heavy.

It is therefore desirable to have an underbelly mower that allows a user to raise one side of the deck while still under the mower frame to allow access to an underside to perform cleaning, repairs or the like and while the mower is in a comparatively stable position. Since the mowers are heavy it is also desirable that a device providing mechanical advantage be used to lift the mower to reveal the underside of the deck. Further, it is desirable to use the device providing mechanical advantage to both lift the mower for maintenance while also alternatively controlling the cutting height of the heavy deck. Still further, it is desirable to provide structure that allows a user to quickly and easily disconnect an end, preferably the rear end, of the deck from a main frame of the mower so as to allow the deck to rotate or swing on the opposite side to further expose the deck underside for maintenance and then quickly and easily reconnect the deck to the frame after maintenance is complete.

SUMMARY OF THE INVENTION

An underbelly mower includes a frame supported by ground engaging wheels and a motor and drive mechanism. The mower has a mowing deck mounted under the frame by a height adjustment mechanism. The height adjustment mechanism includes a mechanical advantage device such as an electrically operated screw, hydraulic ram, manual screw and the like for moving the deck between cutting heights. The term mechanical advantage device as used herein means a device that fully performs an operation for an operator or that multiplies the strength of an operator in performing an operation with the mower. The deck is also swingable or pivotal at the front thereof relative to the frame so as to allow access to the underside of the deck for maintenance. The mechanical advantage device is also utilized for the second purpose of operably swinging the deck from between a mowing configuration and a maintenance configuration. The mechanical advantage device is therefore a single unit that has two different modes of operation and performs two separate tasks in the mower.

In one embodiment, the mechanical advantage device moves between extended and retracted configurations and engages a first receiver to set height and is swingable to a second receiver to move between mowing and maintenance configurations. In a second embodiment, the mechanical advantage device adjusts cutting height through one receiver and rotates to a second position to engage the ground for moving the deck between mowing and maintenance configurations. In a third configuration, the mechanical advantage device adjusts cutting height through a first range of motion and moves the deck between cutting and maintenance configurations through a second range of motion.

In many of the mowers of this type, the rear of the deck is secured to the frame by a support mechanism that must be disconnected and reconnected when moving between the mowing and maintenance configurations. A quick release and connection mechanism is provided for this purpose which includes at least one horizontal catch bar mounted on the deck and a hook mechanism that is received over the bar in a locking configuration and is released or free from the bar in a release configuration. The hook is pivotally mounted on the deck suspension mechanism and can be rotated by a crank when the operator wishes to connect or disconnect the deck relative to the frame. A first keeper is provided to keep the hook about the bar while in the mowing configuration and a second keeper is provided to keep the hook away from the bar while in the maintenance configuration.

OBJECTS AND ADVANTAGES OF THE INVENTION

Therefore, the objects of the invention are to: provide a mower with a mowing deck that can be easily and preferably non manually converted between a mowing configuration and a maintenance configuration; to provide such a mower wherein a mechanical advantage device serves the combined purpose of moving the deck between the mowing and maintenance configurations and adjusting cutting height of the mowing deck; to provide such a mower having a quick release and connection mechanism for allowing an operator to connect or disconnect the rear of the mowing deck from a frame of the mower to allow the deck to swing between mowing and maintenance configurations; and to provide such a mower which is easy to use, very user friendly, affordable and especially well suited for the intended purpose thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 2 is a fragmentary and enlarged side elevational view of the mower with a mechanical advantage device shown in a first position to adjust between mowing and maintenance configurations in solid lines and a second position to adjust cutting height in phantom and showing the moving deck in a mowing configuration.

FIG. 5 is a fragmentary and enlarged side elevational view of the mower especially showing the quick release and attachment mechanism on the side opposite FIG. 4 and showing the mechanism in a locked or mowing configuration.

FIG. 6 is a view similar to FIG. 5 except with the mechanism in an unlocked or released configuration.

DETAILED DESCRIPTION OF THE INVENTION

Figure 1:
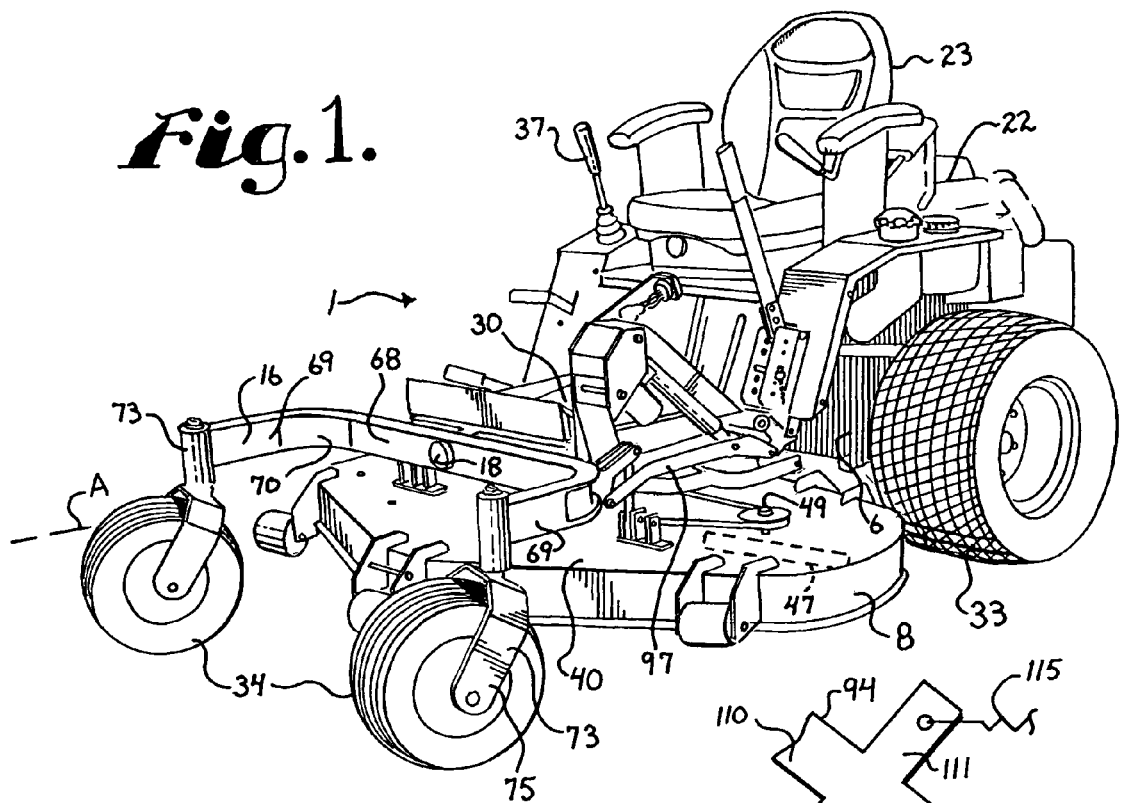
FIG. 1 is a perspective view of a mower in accordance with the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally represents a first mower in accordance with the present invention. The mower 1 comprises a frame assembly 5, a motor and drive apparatus 6, ground engaging wheels 7, a mower deck 8, a deck height adjustment assembly 9, and a deck pick up mechanism 10.

The frame assembly 5 includes a rear main frame 15 and a front pivot frame 16. The main frame 15 has a front to rear axis A that is centered from side to side. A pivot pin 18 extends forward of the main frame 15 along the axis A and pivotally receives the front frame 16 thereon so that the front frame 16 can rotate relative to the main frame 15 due to change in terrain being traversed by the mower 1.

Figure 3:
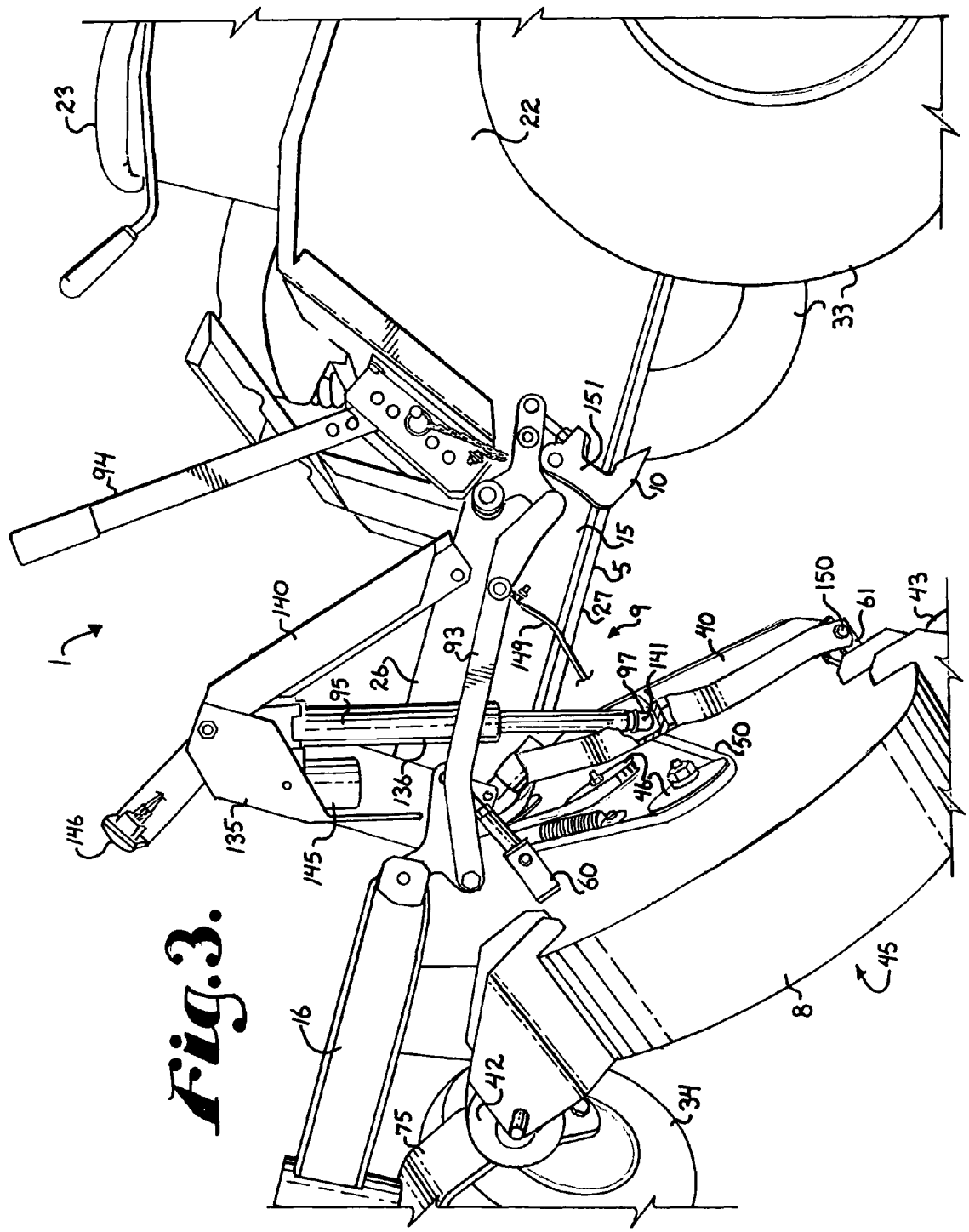
FIG. 3 is a fragmentary and enlarged side elevational view of the mower showing the deck in the maintenance configuration.

The main frame 15 supports a body 22 and an operator's seat 23. The main frame 15 is generally rigid and includes a pair of lower and forward extending main structural members 26 and 27 joined at the front by a cross member 28. Pivotally mounted on top of the members 26 and 27 is an operator floor board 30 which can be raised (as shown in FIG. 3) to provide access to lower elements of the mower 1.

The frame assembly 5 also supports and the motor and drive apparatus 6 which in the present embodiment includes a gasoline driven engine and a pair of hydrostatic transmission which are not separately shown and are generally well known in the art. It is foreseen that the motor and drive assembly used with the invention can vary substantially and be consistent for use with the current invention.

The ground engaging wheels 7 of the illustrated embodiment include a pair of rear wheels 33 and a pair of front wheels 34. Preferably, the rear wheels 33 of this embodiment are separately driven by the separate transmissions to provide for "zero turning radius". A joy stick 37 is provided for the operator to control the direction of rotation and speed of each of the rear wheels 33 independently by systems well known in the art.

The mower deck 8 is mounted to be suspended beneath the frame forward extending members 26 and 27 by the deck height adjustment mechanism 9. The mower deck 8 has a main body 40 with front wheels 42 and rear wheels 43. The deck 8 has an open underside 45 within which multiple mower blades 47 are mounted. The blades 47 are driven by pulleys 48 that are in turn driven by a drive belt 50 that is driven by a pulley 52. The pulley 52 is rotated by a pulley 53 that in turn is driven by a belt 54 that is driven the motor and drive apparatus 6. In the illustrated embodiment, there are two belts 50 and 54 driving three mower blades 47; however, it is foreseen that various numbers of blades could be rotated by one or more than two belts in ways commonly used by those having skill in the art. The deck 8 has a pair of laterally spaced front support connections 60 and a pair of laterally spaced rear support connections 61.

The front pivot frame 16 has an elongate rear arm 68 that generally extends laterally from side to side and is joined by the pivot pin 18 to the main frame 15. A pair of forward arms 69 extend forward of the rear arm 68 so as to form a C-shaped structure 70. The front wheels 34 are respectfully mounted on front ends of the forward arms 69 in a castor type mounting 73. The mounting 73 includes a yoke 75 with a rigid upwardly extending shaft or rod 77 that is pivotally received in an annular sleeve 78 mounted in the front ends of respective forward arms 69.

Figure 7:
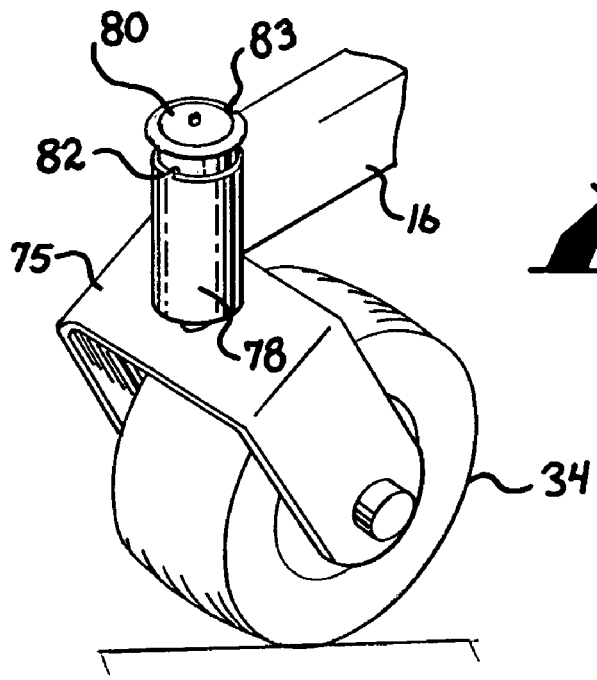
FIG. 7 is a perspective view of a front castor wheel of the mower with the wheel on the ground and an upper position keeper released to allow rotation.
Figure 8:
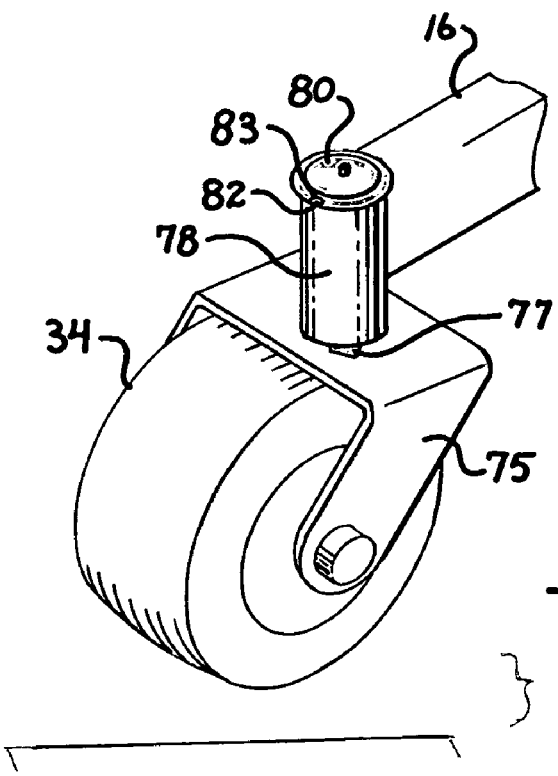
FIG. 8 is similar to FIG. 7 except the wheel is raised off the ground and the position keeper is holding the wheel in an extended forward position.

The rod 77 is held in the sleeve 78 by a bolt received through a cap 80. The cap 80 covers the top of the sleeve 78 and has a recess 82 located on one side. The sleeve 78 has an upward extending abutment 83 that is sized and shaped to receive the recess 82 so as to prevent rotation. The rod 77 is longer than the sleeve 78, such that when the front wheels 34 are on the ground (FIG. 7) and the front frame 16 is pushing downwardly on the sleeve 78 relative to the rod 77, the receiver 82 does not engage the abutment 83. However, when the wheels 34 raise from the ground (FIG. 8), the wheels 34 can be rotated to be away from the deck 8 and locked or secured in this position by engagement of the receiver 82 on the abutment 83 and in this manner prevent the wheels 34 from binding against the deck 8 during raising of the front of the deck 8.

The deck height adjustment assembly 9 includes a pair of front bell cranks 90, a pair of rear bell cranks 91, a connecting member 93, a manual height adjustment mechanism 94, a mechanical advantage height adjustment mechanism 95 and a deck rotating abutment plate 97.

The front bell cranks 90 are laterally spaced by a bar 92 that causes the cranks 90 to rotate together. The cranks 90 are pivotally joined to opposite sides of the front frame 16. The rear bell cranks 91 are joined by a bar 93 that causes the cranks 91 to rotate together. The cranks 91 are pivotally joined to respective frame members 26 and 27. Each front bell crank 90 has a lower frontward extending arm 96A and a rearward extending arm 96. The front crank rearward extending arms 96 are each pivotally attached to respective front support connections 60 on the deck 8 by links 100. Each front crank frontward extending arm 96A is pivotally attached to a front end of the connecting member 93.

Each rear bell crank 91 has a lower frontward extending arm 101 and a rearward extending arm 102. Each rear bell crank rearward arm 102 is pivotally attached to a respective rear support connection 61 by the pick up mechanism 10, as discussed below. The rear crank rearward extending arm 102 on the same side as the height adjustment mechanism 94 is also pivotally attached thereto, as described further below. The rear crank frontward extending arm 101 on the side of the connecting member 93 is also pivotally connected to the rear of the connecting member 93.

The manual height adjustment mechanism 94 (see FIGS. 2 and 4) has an operator handle 110 that has a cross member 111 near a lower end that is pivotally connected to the main frame 15. The handle 110 extends through a receiving channel 112 with a plurality of setting positions identified by bores 113 that are sized and shaped to receive a pin 114 across the movement path of the handle 110. One side of the cross member 111 receives a tensioning spring 115 and the opposite side is pivotally joined to the rear bell crank 91 by a link 117. The manual height adjustment mechanism 94 is not required for all embodiments, but rather is used to allow a user to set a minimum cutting height by inserting the pin 114 and then using the mechanical advantage height adjustment 95 to position and then release the deck 8 to the manual height adjustment mechanism 94 so as to offload at least part of the weight of the deck 8 to the pin 114. However, it is foreseen that all height adjustment and maintenance could be accomplished using only the mechanical height adjustment mechanism 94.

The connecting member 93 has a pair of spaced side plates 120 and 121 joined at a rear end thereof by a cup like abutment receiver 123 extending between the plates 120 and 121.

The deck rotating abutment plate 97 is pivotally attached at a lower end to the deck rear support connector 61 that is located on the side of the manual adjustment mechanism 94. An upper end of the abutment plate 97 is swivelably joined to the main frame member 26. The plate 97 also functions as a drag bar between the frame assembly 5 and the deck 8 in this embodiment. An abutment receiver 130 is provided to receive and capture an end of the mechanical advantage mechanism 95 during rotation of the deck 8 relative to the main frame 15.

However, the connection of the abutment plate 97 to the frame assembly 5 is to provide added mechanical advantage in certain embodiments and the swiveling is provided to allow the deck 8 to swivel relative to the main frame 15 during movement of the deck 8 relative to the main frame 15, but it is foreseen that in certain embodiments the abutment receiver for rotating the deck could just attach to the deck and/or be a simple structure for receiving the mechanical advantage adjustment mechanism 95 on the deck 8 and holding the two in a stable relationship. A pop in ball or the like that would not disengage once rotation is started could be provided to allow the deck and frame to rotate relative to each other but hold the mechanical advantage height adjustment mechanism in place during such movement.

The mechanical advantage height adjustment mechanism 95 includes a support structure 135 and an electric extendable screw 136. The support structure 135 is fixedly attached to the main frame 15 and extends upwardly therefrom. An upper end of the mechanism 95 is pivotally attached to an upper end of the support structure 135 which includes a cover 140 that moves with the screw 136. A bottom or tip 141 of the screw 136 is not attached to any structure except the screw 136. The screw 136 is operated by a motor 145 that is controlled by an operator switch 146 that is mounted on the support structure 135 and that is provided power from the motor and drive apparatus 6 of the mower 1.

The screw 136 has two different configurations. In a first height adjustment configuration (phantom lines in FIG. 2), the abutment top 143 is received in the connecting member receiver 123. In the first configuration, the height of the deck 8 relative to the ground is modified by the screw 136 extending or retracting with the manual height adjustment pin 114 preventing further adjustment once a preferred height is reached, even if further retracted. Note extending the screw 136 biases against the connector 93 and raises the deck 8, retraction of the screw 136 allows the deck 8 to lower due to gravity. In particular, when the screw 136 is extended the bell cranks 90 and 91 rotate to raise the deck 8 and the opposite has the effect of lowering the deck 8.

The screw 136 has a second height adjusting configuration (solid lines in FIG. 2) wherein the screw 136 is used to pivot, rotate or swing the deck 8 at the front thereof relative to the frame 15, as is shown in FIG. 3. For this to occur several steps must be taken. In particular, the screw 135 must be retracted so as to exit the receiver 123 which allows the screw 136 to swing downwardly between the plates 120 and 121 where the screw 136 is prevented from sideways movement by the plates 120 and 121. Thereafter, the abutment tip 141 of the screw 136 enters the receiver 130 of the abutment plate 97. The screw 136 is thereafter extendable so as to bias against the receiver 130. Before extending the screw 136, the deck pickup mechanism 10 is released, as described below, so as to allow the rear of the deck 8 to swing downwardly and forwardly relative to the main frame 15, as shown in FIG. 3, to allow servicing of the deck underside 45 and blades 47. A safety strap 149 (see FIG. 2) joins the abutment plate 97 and connecting member 93 to prevent over rotation of the deck 8 and to also keep the abutment tip 141 from falling out of the receiver 130, if a user should manually lift the front end of the mower 1. While an electric screw is shown and described as the mechanical advantage adjustment mechanism, it is foreseen that other types of devices such as hydraulic rams or manual screws may be also used. The key advantage of the mechanical advantage device, as used herein, is that it both provides for rotation of the deck relative to the frame and for height adjustment of the deck relative to both the ground and the frame. The mechanical advantage device thus serves two purposes. Also, while the control for the mechanical advantage device is illustrated as being located on the support for the mechanical advantage device, it is foreseen that the control may be located at different locations about the mower 1, including that the control could be mounted on the body 22 near the seat 23.

The deck pick up mechanism 10 is for the purpose of allowing a user to quickly release the rear end of the deck 8 from the main frame 15 so as to allow the deck 8 to pivot and rotate on the front hangers thereof and to likewise quickly and easily reconnect the rear of the deck 8 to the main frame 15. The deck pick up mechanism 10 is physically located between the deck 8 and the deck height adjustment mechanism 9.

Figure 4:
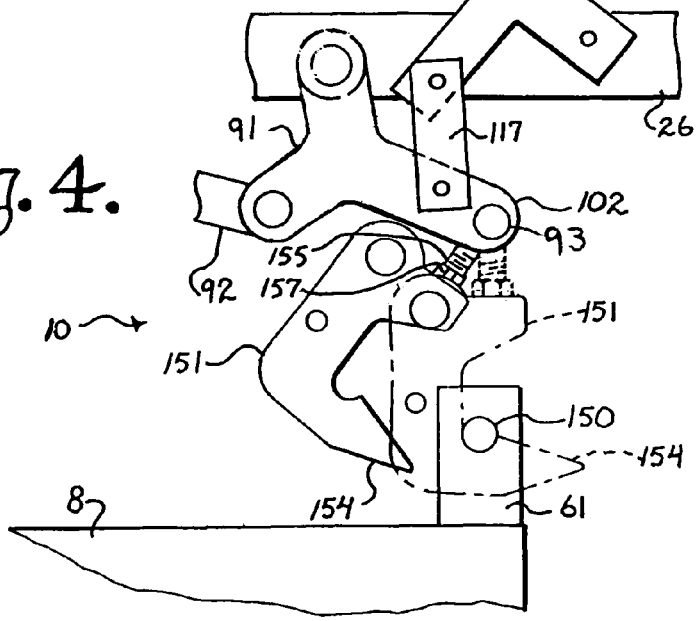
FIG. 4 is a fragmentary and enlarged side elevational view of the mower especially showing a portion of a quick release and attachment mechanism to the driver's left with other parts not shown to better illustrate the mechanism.

Each of the deck rear support connections 61 includes a horizontally aligned bar 150 that extends from side to side and is accessible from front to rear. The pick up mechanism 10, as best seen in FIGS. 4, 5 and 6 comprises a pair of laterally spaced hook elements 151 joined by a bar 152. The hook elements 151 each include a rearwardly extending hook 154 which are configured so as to be able to be simultaneously aligned with respective bars 150 of the deck rear support connections 61. Each of the hook elements 151 are also pivotally attached by a bolt 155 to a respective rear bell crank rearward extending arm 102. The bolt 155 can be adjusted by rotation and resetting of a nut 157 to make minor adjustments in side to side or front to rear height of the deck 8.

Shown in FIGS. 5 and 6 is the side of the pick up mechanism 10 to the operator's right when sitting in the seat 23. Attached to the bar 152 and extending generally forward is an operator's crank handle 160. Located about the hook 154 on this side is a keeper 162 that rotates on the bar 152 and covers a mouth 163 of the hook 154 to capture the support connection bar 150 when placed thereover and being biased to this position (see FIG. 5) by a spring 164. The keeper 162 can be manually rotated by pushing on a thumb hold 166 so that the hook mouth 163 becomes open and the bar 150 can exit. The operator then cranks the handle 160 to rotate the hook 154 out of engagement with the bar 150.

A generally planar holding plate 170 is pivotally attached near one end thereof, to the bell crank 91. The plate includes a notch 173 that is sized and shaped to receive the bar 152 when the hook 154 is not in engagement with the bar 150, so as to hold the hooks 154 away from the bars 150 while the deck 8 is rotated relative to the main frame 15. The plate 170 is raised at the rear end when the operator wishes to release the bar 152 from the notch 173. The process is reversed to rejoin the rear of the deck 8 to the main frame 15. That is, the handle 160 is rotated clockwise to again engage the hooks 154 under the bars 150 until the keeper 162 reaches and secures the hooks 154 to the bars 152.

Each of the hook elements 151 has a bore 180 that receives the bar 152. The bores 180 are larger in diameter then the bar 152 and the bar 152 is secured to the hook elements 151 by pivot pins 182 so as to allow the hook elements 151 to wobble relative to the bar 152. This allows the mower deck 8 to torque to follow the movement of the front frame 16 during movement over non planar ground.

The pick up mechanism 10 of the present application easily and quickly connects and disconnects the rear of the deck 8 from the main frame 15. The reconnection is facilitated in that the front hangers connecting the front of the deck 8 to the frame assembly 5 further in combination with the abutment plate 97 operably generally maintain alignment between the rear support connector bars 150 and hooks 154, so that after being lowered, the deck 8 does not have to be moved or manually adjusted in order for the hooks 154 to be positioned to engage the bars 150.

While only a rear pick up mechanism 10 is shown herein, it is possible in some embodiments for a generally like mechanism to be used in conjunction with joining the front of the deck 8 to the frame assembly 5, so the entire deck can be disconnected from the frame.

In use the mower 1 is utilized to mow as a conventional mower. When height adjustment is desired, the deck 8 cutting height is adjusted by the deck height adjustment assembly 9 and, in particular, by the mechanical advantage height adjustment screw 136 acting independently or in conjunction with the manual height adjustment mechanism 94. When it is desired to raise the deck 8 for maintenance, the rear of the deck is disconnected from the main frame 15 by operating the pick up mechanism 10 to disengage the hooks 154 from the bars 150 and thereafter changing the screw 136 from biasing against the connecting member receiver 123 and against the abutment plate 97. The deck 8 is then rotated or swing at the front thereof relative to the frame 15 to the maintenance configuration seen in FIG. 3. The process is reversed when the service on the deck 8 is complete to return the deck 8 to the mowing configuration seen in FIG. 1.

Figure 9:
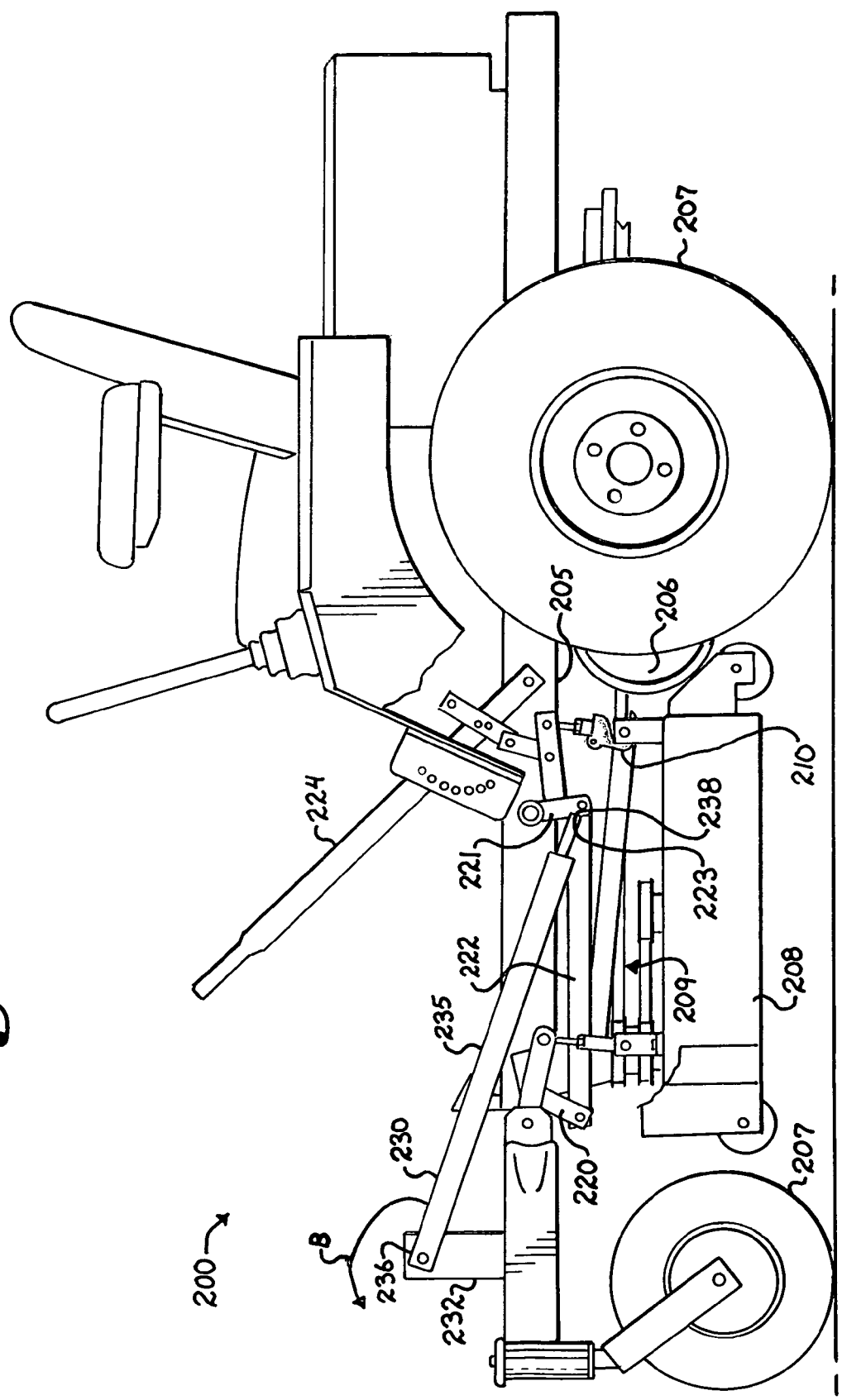
FIG. 9 is a side elevational view of a first modified embodiment of a mower in accordance with the present invention, shown with a mower deck in a mowing configuration.
Figure 10:
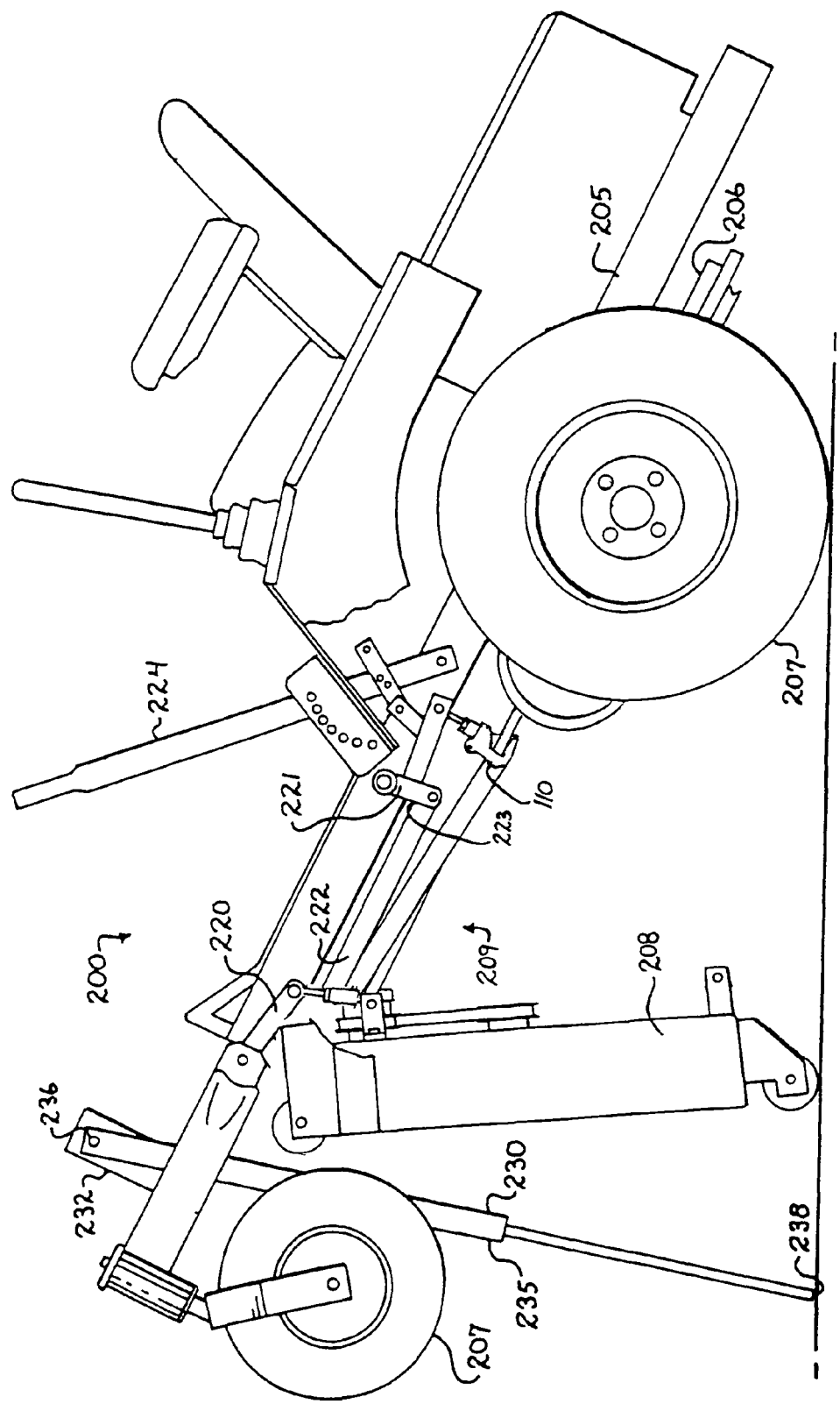
FIG. 10 is a side elevational view of the first modified mower with the deck in a maintenance configuration.

Illustrated in FIGS. 9 and 10 is a second mower in accordance with the present invention and generally identified by the reference numeral 200. The mower 200 is in many ways quite similar to the mower 1 such that the identical parts will not be rediscussed in detail. Reference is made to the description of mower 1 for additional detail.

The mower 200 includes a frame assembly 205, a motor and drive apparatus 206, engaging wheels 207, a mower deck 208, a deck height adjustment assembly 209 and a quick pick up and detachment mechanism 210.

The height adjustment assembly 209 includes front bell cranks 220 and rear bell cranks 221 joined by a connecting plate 222 with an abutment receiver 223 thereon. The assembly 209 also is shown with an optional manual adjustment mechanism 224. The principal difference between the mower 200 and the mower 1 is that in the present embodiment, the height adjustment assembly 209 includes a mechanical advantage device 230 that is different from the prior embodiment. The device 230 includes a support structure 232 mounted on and extending upwardly from the frame assembly 205. The device 230 also includes a hydraulic ram 235 that is pivotally attached at one end 236 thereof to the support structure 232. It is foreseen that electric extendable screws would also function well for this embodiment. The ram 235 has an opposite end 238 that abuts against the receiver 223 when in the mowing configuration so that as the ram 235 extends or contracts, an end or tip 238 abuts against the receiver 235 and raises or lowers the deck 208 cutting height accordingly. It is foreseen that in some embodiments, the end 238 may be able to be removably secured to the receiver 223 by a pin or the like or engage an abutment receiver as in the previous embodiment.

The ram 235 also has a maintenance configuration as is seen in FIG. 10. In order to move from the mowing configuration of FIG. 9 to the maintenance configuration, the ram 235 is retracted and rotated about the end 236 as indicated by the reference arrow labeled B in FIG. 9 so as to be pointed at the ground and then the ram 235 is extended to raise the front of the mower 200. A plate may be utilized under a tip 238 if the ground is not hard such as pavement.

Preferably, the mower 200 includes the quick pick up and detachment mechanism 210 of the type used with mower 1 so that the rear of the deck 208 can be detached from the frame assembly 205, as seen in FIG. 10. However, it is foreseen that the deck 208 can be left attached for less extensive access.

Figure 11:
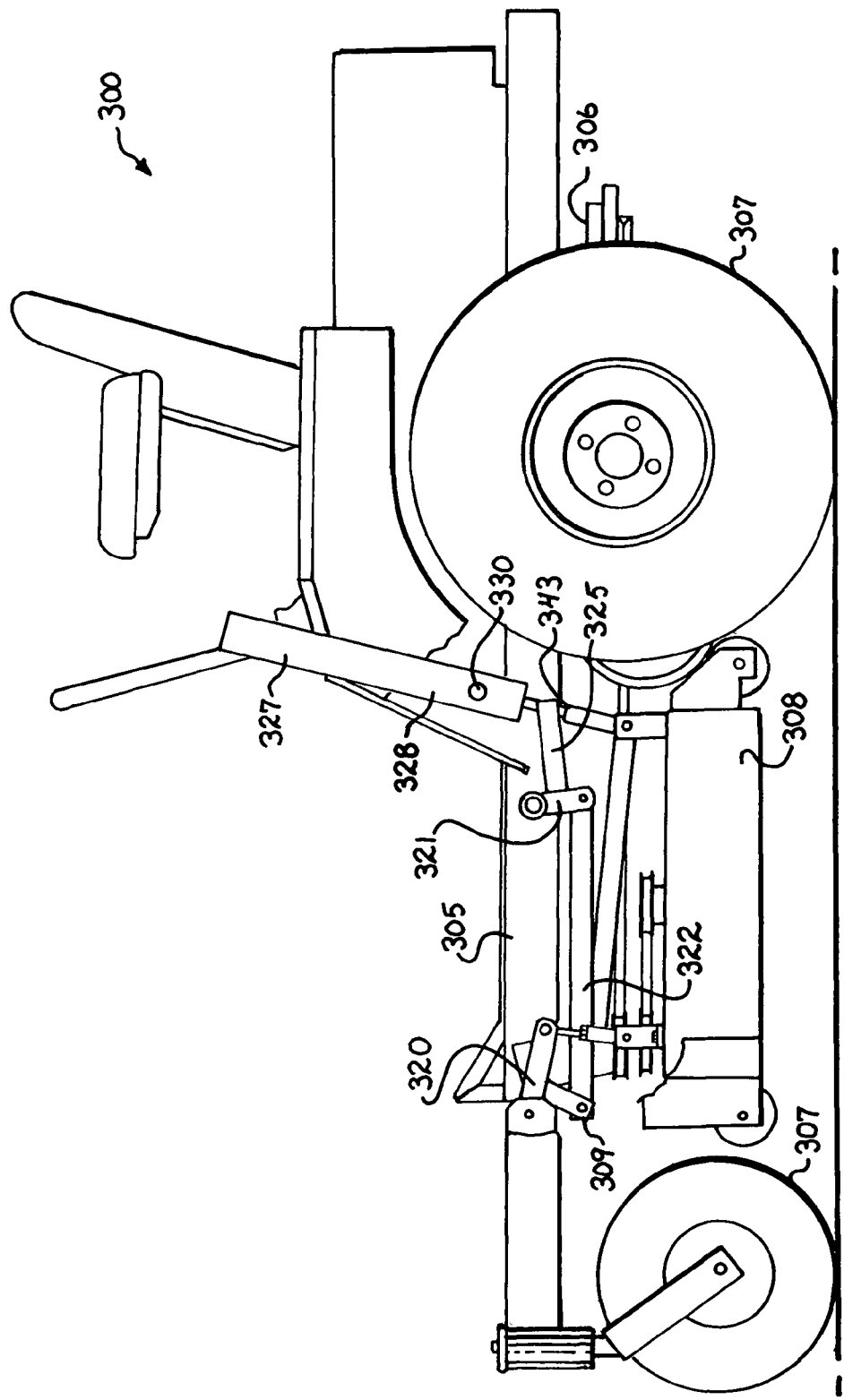
FIG. 11 is a side elevational view of a second modified embodiment of a mower in accordance with the present invention, shown with a mower deck in a mowing configuration.
Figure 12:
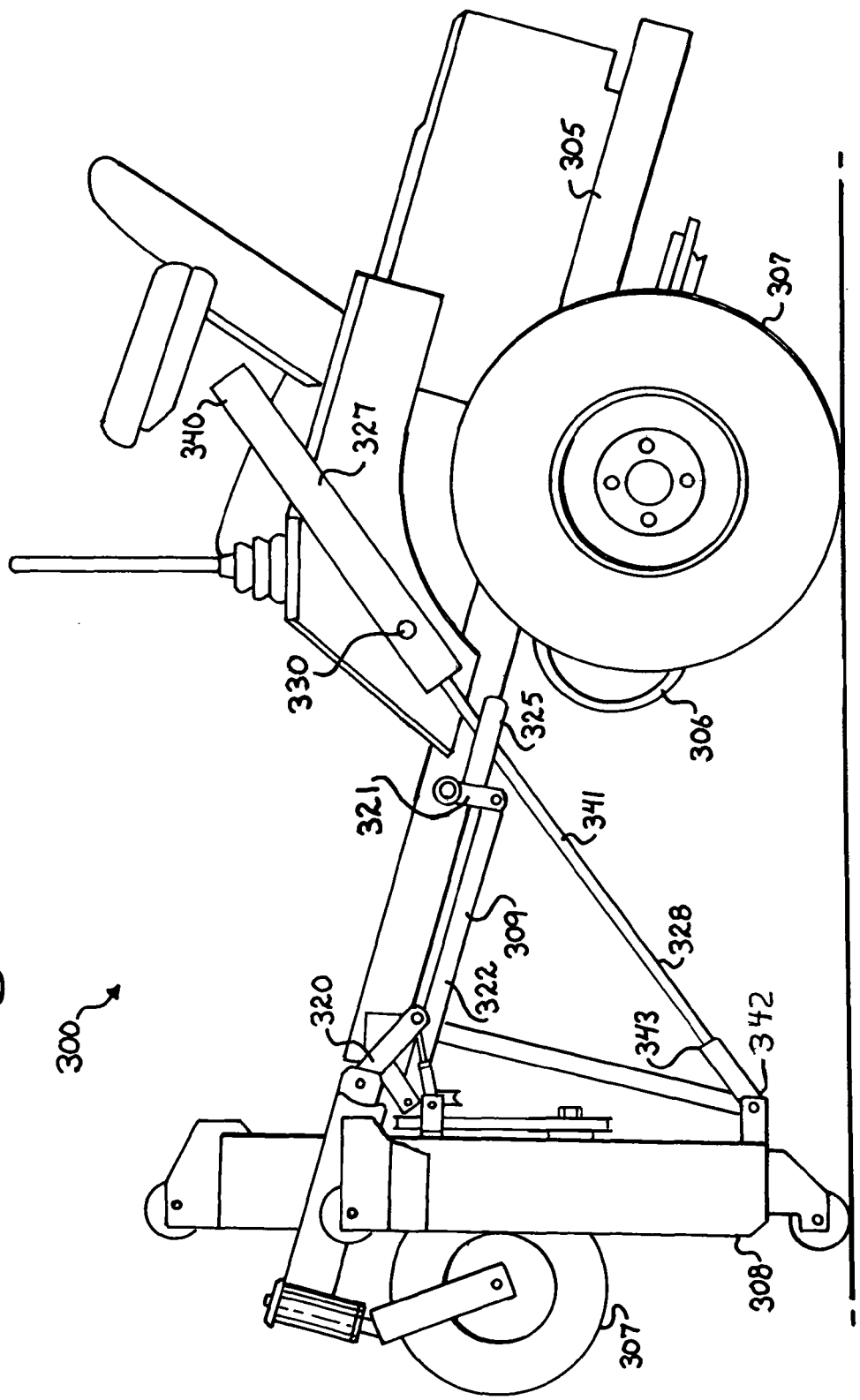
FIG. 12 is a side elevational view of the second modified mower with the mowing deck in a maintenance configuration.

Illustrated in FIGS. 11 and 12 is a second mower in accordance with the present invention and generally identified by the reference numeral 300. The mower 300 is in many ways quite similar to the mower 1 such that the identical parts will not be rediscussed in detail. Reference is made to the description of mower 1 for additional detail.

The mower 300 includes a frame assembly 305, a motor and drive apparatus 306, engaging wheels 307, a mower deck 308 and a deck height adjustment assembly 309.

The height adjustment assembly 309 includes front bell cranks 320 and rear bell cranks 321 pivotally joined to the frame assembly 305 and joined by a connecting member 322. The rear bell crank 321 on the driver side has a rearwardly extending engagement arm 325.

The height adjustment assembly 309 includes a mechanical advantage device 327 comprising an electrically driven extendable screw 328. The screw 328 is pivotally secured at location 330 so as to be connected to the frame assembly 305 and so as to be able to rotate in a vertical plane that extends from front to rear through the location 330. A lower end 342 of the screw 328 is pivotally connected to the deck 8. The screw 328 includes a body 340 and an extension shaft 341 and provides two functions that depend upon the degree of extension of the shaft 341 relative to the body 340.

The shaft 341 has a stop 343 located therealong. As the shaft 341 moves in and out of the body 340 over a first range of motion, the stop 343 abuts against the engagement arm 325 so as to effectively rotate the bell cranks 320 and 321 and move the deck 308 between different cutting heights thereof. Once the shaft 341 extends past the first range of motion, the shaft 341 disengages from the arm 325 and further extension of the shaft 341 causes the rear of the deck to rotate downwardly and forwardly from the cutting configuration seen in FIG. 1 to the maintenance configuration seen in FIG. 12. The process is reversed to revert to the cutting configuration. The mechanical advantage device 327 thus has two modes of operation and serves to both adjust the cutting height and to rotate the deck depending upon the made of operation of the shaft 341.

It is to be understood that while certain forms of the present invention have been illustrated and described herein, it is not to be limited to the specific forms or arrangement of parts described and shown.

What is claimed and desired to be secured by Letters Patent is as follows:

1. A mower comprising:
   a) a frame;
   b) a mowing deck;
   c) a height adjustment mechanism operably allowing a user to vary the cutting height of the deck relative to the frame; said height adjustment mechanism includes a connecting member that operably coordinates height adjustment of the front and rear of the deck;
   d) a mechanical advantage device operably joined with the height adjustment mechanism in a first operating mode so as to operably move the deck between different cutting heights of the deck in a cutting configuration;
   said mechanical advantage device in a second operating mode cooperating between the frame and the deck to operably rotate the deck about a front end of the deck so as to move the deck between the cutting configuration and a maintenance configuration; the mechanical advantage device being pivotally joined at a first end to the frame and being selectively movable about a second end into both modes such that the mechanical advantage device is utilized to both adjust cutting height and rotate the deck between cutting and maintenance configurations;
   e) said mechanical advantage device in the first mode of operation selectively biasing against the connecting member so as to adjust the mower cutting height; and
   f) said mechanical advantage device in the second mode of operation being selectively positioned to engage ground beneath the mower so as to move the deck between the maintenance and cutting configurations when extended and contracted.

2. A mower comprising:
   a) a frame;
   b) a mowing deck;
   c) a height adjustment mechanism operably allowing a user to vary the cutting height of the deck relative to the frame;
   d) a mechanical advantage device operably joined with the height adjustment mechanism in a first operating mode so as to operably move the deck relative to the frame between different cutting heights of the deck in a cutting configuration; said mechanical advantage device in a second operating mode cooperating between the frame and the deck to operably rotate the deck relative to the frame about a front end of the deck so as to move the deck between the cutting configuration and a maintenance configuration; the mechanical advantage device being pivotally joined at a first end to the frame and being selectively movable about a second end into both modes such that the mechanical advantage device is utilized to both adjust cutting height and rotate the deck between cutting and maintenance configurations;
   e) said height adjustment mechanism includes a connecting member that operably coordinates height adjustment of the front and rear of the deck; said mechanical advantage device in the first mode of operation selectively biasing against the connecting member so as to adjust the mower cutting height; and
   f) said mechanical advantage device in the second mode of operation being selectively positioned to engage ground beneath the mower so as to move the deck between the maintenance and cutting configurations when extended and contracted.

* * * * *